United States Patent
Ynclino, V et al.

(10) Patent No.: US 10,643,044 B2
(45) Date of Patent: May 5, 2020

(54) VARIABLE DEPTH OF FIELD SCANNING DEVICES AND METHODS

(71) Applicant: NCR Corporation, Duluth, GA (US)

(72) Inventors: Eugene Semblante Ynclino, V, Cebu (PH); Janry Corpuz Amada, Kabankalan (PH); Rene Catacutan Borromeo, Jr., Tanjay (PH); Steven Joel Hammer, Lilburn, GA (US); Jerome Mojados Puza, Lapu-Lapu (PH)

(73) Assignee: NCR Corporation, Atlanta, GA (US)

( * ) Notice: Subject to any disclaimer, the term of this patent is extended or adjusted under 35 U.S.C. 154(b) by 76 days.

(21) Appl. No.: 15/338,994

(22) Filed: Oct. 31, 2016

(65) Prior Publication Data

US 2018/0121696 A1 May 3, 2018

(51) Int. Cl.
*G06K 7/10* (2006.01)
*G06K 7/14* (2006.01)

(52) U.S. Cl.
CPC ..... *G06K 7/10831* (2013.01); *G06K 7/10722* (2013.01); *G06K 7/10811* (2013.01); *G06K 7/1413* (2013.01)

(58) Field of Classification Search
CPC ............. G06K 7/1096; G06K 7/10831; G06K 7/10722; G06K 7/10811; G06K 7/1413
See application file for complete search history.

(56) References Cited

U.S. PATENT DOCUMENTS

| | | | | |
|---|---|---|---|---|
| 4,362,372 A | * | 12/1982 | Kiesel | G02B 7/40 396/89 |
| 5,991,041 A | * | 11/1999 | Woodworth | G01B 11/04 356/602 |
| 6,484,066 B1 | * | 11/2002 | Riess | G01B 11/00 198/502.2 |
| 8,322,621 B2 | * | 12/2012 | Olmstead | G06K 7/10702 235/462.41 |
| 8,632,011 B2 | * | 1/2014 | Gao | G06K 7/12 235/455 |
| 8,939,369 B2 | * | 1/2015 | Olmstead | G06K 7/10722 235/438 |
| 8,985,462 B2 | * | 3/2015 | Goren | G06K 7/10801 235/435 |
| 9,104,929 B2 | * | 8/2015 | Todeschini | G06K 7/10811 |
| 9,311,515 B2 | | 4/2016 | Pacina et al. | |

(Continued)

FOREIGN PATENT DOCUMENTS

EP 2367137 A1 9/2011

OTHER PUBLICATIONS

European Search Report issued in co-pending European Patent Application 17196784.7 dated Mar. 5, 2018.

*Primary Examiner* — Thien M Le
*Assistant Examiner* — Asifa Habib
(74) *Attorney, Agent, or Firm* — Schwegman, Lundberg & Woessner

(57) ABSTRACT

Various embodiments herein each include at least one of systems, methods, devices, barcode scanners, and software for variable depth of field scanning devices and methods. One such embodiment includes determining a distance from a known point to an item presented for scanning by a barcode scanner. This embodiment further includes adjusting a variable lens of a camera of the barcode scanner to a depth of field based on the determined distance.

11 Claims, 7 Drawing Sheets

(56) References Cited

U.S. PATENT DOCUMENTS

| | | | | |
|---|---|---|---|---|
| 9,342,724 | B2* | 5/2016 | McCloskey | G06K 7/10831 |
| 9,489,564 | B2* | 11/2016 | Gattuso | H04N 5/23219 |
| 9,693,038 | B2* | 6/2017 | McCloskey | G06T 5/50 |
| 9,715,612 | B2* | 7/2017 | Nunnink | G06K 7/10811 |
| 9,779,276 | B2* | 10/2017 | Todeschini | G06K 7/1426 |
| 9,785,814 | B1* | 10/2017 | Todeschini | G06K 7/1426 |
| 2005/0218231 | A1* | 10/2005 | Massieu | G02B 3/14 |
| | | | | 235/472.01 |
| 2008/0136958 | A1* | 6/2008 | Nakahara | G06K 9/00255 |
| | | | | 348/345 |
| 2008/0024587 | A1 | 10/2008 | Good | |
| 2008/0245872 | A1* | 10/2008 | Good | G06K 7/10811 |
| | | | | 235/462.24 |
| 2013/0169853 | A1* | 7/2013 | Luong | H04N 5/23206 |
| | | | | 348/345 |
| 2013/0181051 | A1* | 7/2013 | Olmstead | G06K 7/1096 |
| | | | | 235/440 |
| 2015/0269403 | A1* | 9/2015 | Lei | G06K 7/10831 |
| | | | | 235/462.24 |
| 2016/0210492 | A1* | 7/2016 | Trajkovic | G06K 7/1096 |

* cited by examiner

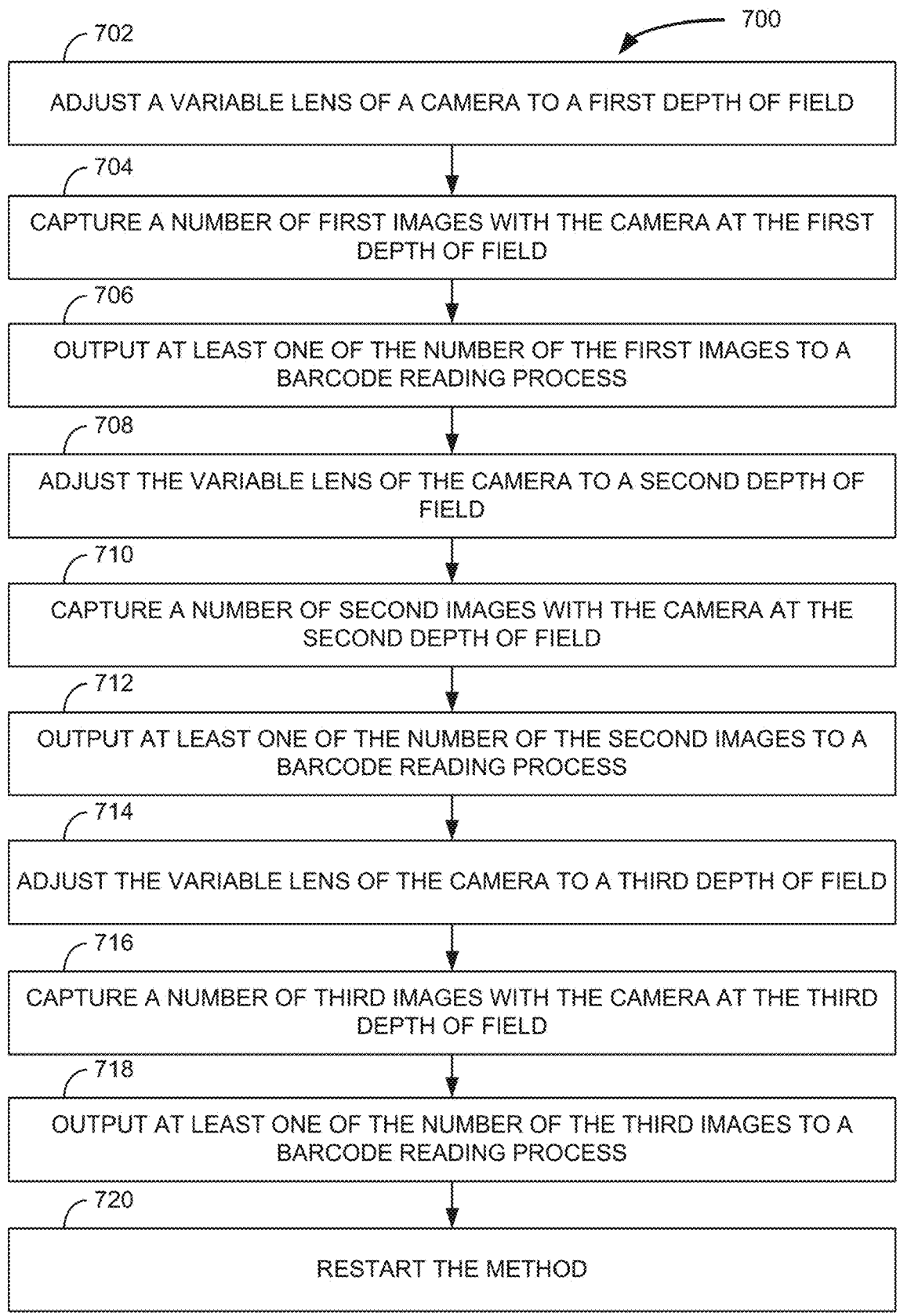

VARIABLE DEPTH OF FIELD SCANNING DEVICES AND METHODS

BACKGROUND INFORMATION

Barcode scanners are commonly at point of sale (POS) terminals to scan barcodes of products to be purchased. Barcode scanners are also deployed for other purposes, such as at kiosks to scan products for price checking, transportation check-in and boarding kiosks and terminals, and the like. Quickness and accuracy of scanning are often important barcode scanner characteristics. Factors that affect the speed and accuracy of barcode scanners include illumination of a scan field, clarity of an image, and distance of an item presented for scanning from the scanner. Current barcode scanners have fixed camera lenses for only a single depth of field and lighting, which may sometimes be altered in brightness, cannot be altered in distance it is focused.

SUMMARY

Various embodiments herein each include at least one of systems, methods, devices, barcode scanners, and software for variable depth of field scanning devices and methods. One such embodiment includes determining a distance from a known point to an item presented for scanning by a barcode scanner. This embodiment further includes adjusting a variable lens of a camera of the barcode scanner to a depth of field based on the determined distance.

Another method embodiment includes adjusting a variable lens of a scanner camera to a first depth of field, capturing a number of first images with the camera at the first depth of field, and outputting at least one of the number of the first images to a barcode reading process. This is then repeated for a second depth of field and then a third depth of field. The method as a whole then iterates and continues to iterate in some embodiments.

A further embodiment according to some embodiments is in the form of a barcode scanner. Such embodiments of a barcode scanner include at least one camera, each camera having a variable lens. The barcode scanner further includes a processor, a memory device, and a barcode reading process stored in the memory that is executable by the processor. The bar code scanner further includes instructions stored on the memory device that are executable by the processor to independently perform data processing activities with regard to each of the at least one cameras to adjust respective variable lenses thereof. The data processing activities, in some embodiments, include adjusting a variable lens of a camera to a first depth of field, capturing a number of first images with the camera at the first depth of field, and outputting at least one of the number of the first images to the barcode reading process. These data processing activities may then repeated for a second depth of field and then a third depth of field. The data processing activities as a whole then iterate and continues to iterate in some embodiments.

BRIEF DESCRIPTION OF THE DRAWINGS

FIG. 7 is a block flow diagram of a method, according to an example embodiment.

DETAILED DESCRIPTION

Figure 1:
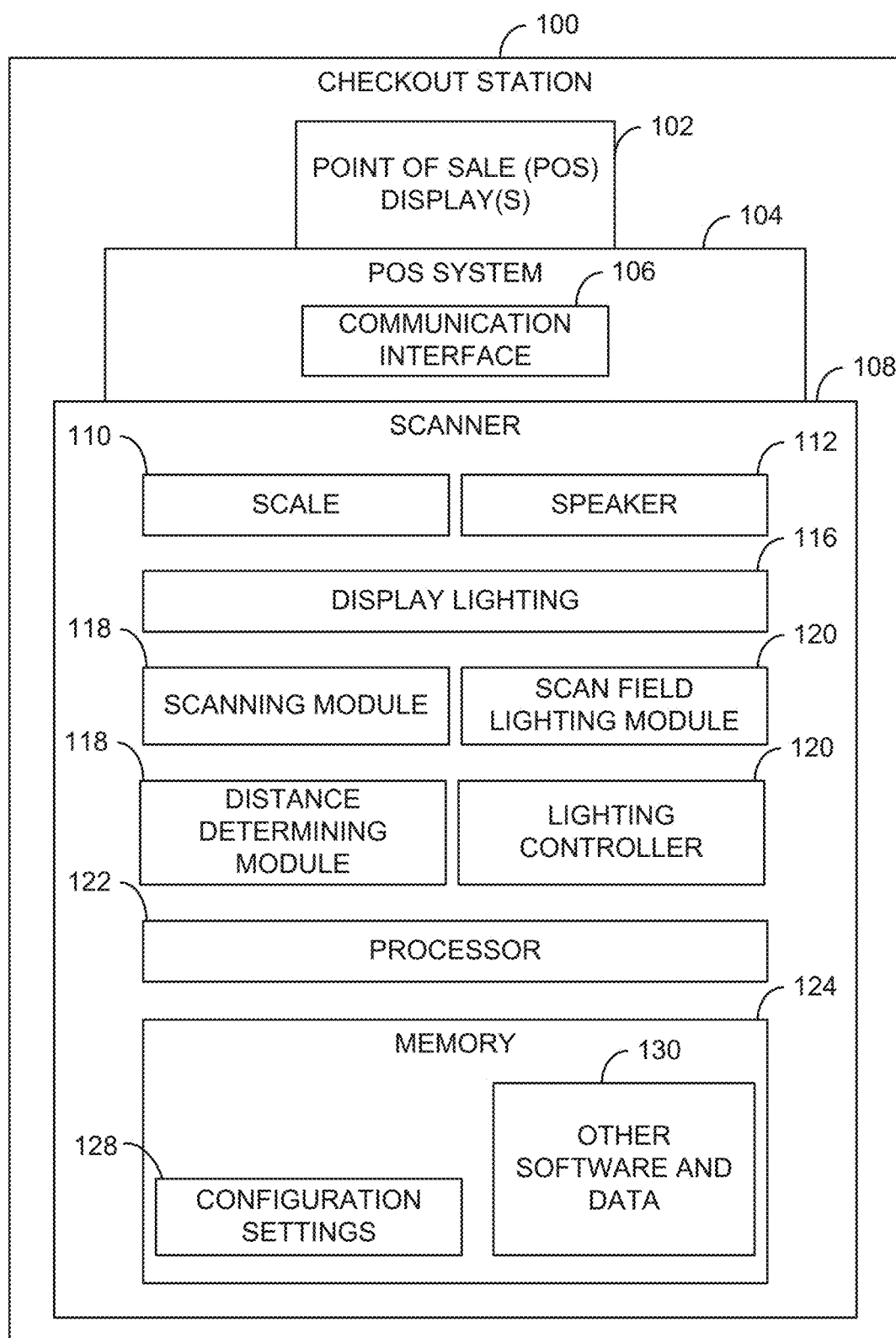
FIG. 1 is a diagram illustrating components of a checkout station having a scanner, according to an example embodiment.

Various embodiments herein each include at least one of systems, methods, devices, barcode scanners, and software for variable depth of field scanning devices and methods. These various embodiments operate to increase the overall performance of a barcode scanner by having a variable depth of field. Depth of Field (DOF) is the distance wherein the imager camera can scan/read the barcode of an item. With the use of a variable lens, embodiments herein greatly enhance and dictate or change the DOF of the camera to ensure that the item can be scanned virtually anywhere from the scanner area. In prior scanners, the depth of field is limited to a narrow distance of a given DOF of the lens being used, usually 8-10 inches. Utilizing a variable lens, allows control and change the DOF of the camera to ensure that the item is on the "sweet spot" or at the middle/center of the DOF.

Some embodiments here include a plurality of set DOF distances that are cycled through by adjusting a variable lens on a barcode scanner camera. In some such embodiments, the DOF will changes at preset distances. The distances are identified, such as by fixed configuration or through barcode scanner calibration that may be achieved in some embodiments through a series of test. In some such embodiments, three present distances may be utilized—Near, Mid and Far. In some embodiments, the DOF may change as the frames on the camera change. The change in DOF is typically synchronized with the frame-rate of the camera. For example, each second, 30 frames may be captured by the camera, and 10/30 frames may be dedicated to the near DOF, 10/30 frames may be dedicated to Mid DOF, and 10/30 frames may be dedicated for far. The sequence of change in DOF may be constant, 1000 millisecond=1 second, 1000 millisecond/30 (frame per second), the frame will change at 33.33 milliseconds. On the first and second frames the lens will be set for the near DOF, on the third and fourth frame the will be set for the mid DOF, and on the fifth and sixth frame the will be set for the far DOF. The cycle will continue until one-second which has 30 frames. The change in DOF may be controlled by a change in voltage to a lens, such as a liquid lens available from Varioptic of Lyon, France, to enable the lens to change in shape and thus resulting in different DOF. Although the efficiency of this example is cut into one-third for the entire camera, such embodiments can still achieve better performance since a larger area can be scanned with a better view. Such embodiments can also achieve much greater performance through use of a higher frame rate camera or framerate setting thereof.

Some other embodiments include a dynamic variable distance DOF. For example, in some such embodiments, the change in DOF is tailored based on a measured distance. The distance may be measured or approximated though use of a distance sensor (Sonar, camera, or other sensor) to determine the position of an object presented for scanning. The use of distance sensor then dictates the change in DOF of the camera lens. In such embodiments, when the item is near, the DOF will change to near zone, when the item is far, the DOF will Change to FAR. In such embodiments, the frame rate is not compromised as all frames may be utilized. The DOF in such embodiments automatically adjusts as the items are place anywhere in the scan zone.

These and other embodiments are described herein with reference to the figures.

In the following detailed description, reference is made to the accompanying drawings that form a part hereof, and in which is shown by way of illustration specific embodiments in which the inventive subject matter may be practiced. These embodiments are described in sufficient detail to enable those skilled in the art to practice them, and it is to be understood that other embodiments may be utilized and that structural, logical and electrical changes may be made without departing from the scope of the inventive subject matter. Such embodiments of the inventive subject matter may be referred to, individually and/or collectively, herein by the term "invention" merely for convenience and without intending to voluntarily limit the scope of this application to any single invention or inventive concept if more than one is in fact disclosed.

The following description is, therefore, not to be taken in a limited sense, and the scope of the inventive subject matter is defined by the appended claims.

The functions or algorithms described herein are implemented in hardware, software or a combination of software and hardware in one embodiment. The software comprises computer executable instructions stored on computer readable media such as memory or other type of storage devices. Further, described functions may correspond to modules, which may be software, hardware, firmware, or any combination thereof. Multiple functions are performed in one or more modules as desired, and the embodiments described are merely examples. The software is executed on a digital signal processor, ASIC, microprocessor, or other type of processor operating on a system, such as a personal computer, server, a router, or other device capable of processing data including network interconnection devices.

Some embodiments implement the functions in two or more specific interconnected hardware modules or devices with related control and data signals communicated between and through the modules, or as portions of an application-specific integrated circuit. Thus, the exemplary process flow is applicable to software, firmware, and hardware implementations.

FIG. 1 is a diagram illustrating components of a checkout station 100 having a scanner 108, according to an example embodiment. It is to be noted that the checkout station 100 is shown schematically in greatly simplified form, with example components relevant to understanding various embodiments herein. The same situation may be true for the other various components of the checkout station 100. Note that the checkout station 100 may include more or fewer components in some embodiments.

Furthermore, the various components included in the FIG. 1 as illustrated and arranged are provided for illustration purposes only. It is to be noted that other arrangements with more or fewer components are possible without departing from the contributions herein, in particular with regard to automatic and remote scanner configuration.

Moreover, the methods and scanner presented herein and below may include all or some combination of the components shown in the context of the checkout station 100. Further, although a checkout station 100 is illustrated as including a scanner 108, the scanner 108 may be a stand-alone element or an element of other systems, devices, and terminals in other embodiments. Examples of other terminal-types that may include a scanner 108 are self-service terminals (SSTs), clerk operated and self-service library checkout stations, time-keeping terminals, and the like.

The methods of some embodiments are programmed as executable instructions in memory and/or non-transitory computer-readable storage media and executed on one or more processors associated with the components and devices herein. Some such components may be firmware.

The checkout station 100 includes one or more POS displays 102 that present information of a POS system 104 coupled to the one or more POS displays. Information presented by the one or more POS displays includes information relevant in a retail context and with regard to operation of the checkout station. The checkout station 100 also includes the scanner 108.

The scanner 108 may be referred to as a barcode scanner as that is the task most commonly associated with such devices. During operation of the checkout station 100, items are placed within a scan field of the scanner 108. One or more scanning modules 118 of the scanner 108, such as a camera, which may include a variable lens in some embodiments, a laser scanner, or both, then scan a barcode of an item presented for scanning and information read therefrom is communicated to the POS system 104. The POS system 104 then uses that data to identify the item presented within the scan field and performs an additional function. The additional function may include a price lookup and addition of the item to a list of items to be purchased, which may be presented on the one or more POS displays 102.

The scanner 108 may include one or more scan fields, such as two scan fields of bi-optic scanners that are commonly seen in grocery and discount retail outlets. In addition to the scanning module 118, the scanner 108 may include various other components. The various other components may include an integrated scale 110 such as may be used in a grocery outlet to weigh produce and one or both of a speaker 112 and display lighting 116 to output audio and visual signals such as signals of (un)successful scans. The scanner 108 may also include one or more scan field lighting modules 120 that may be turned on and off and adjusted based on a detected presence of an item to be scanned, a distance from a scanning surface of an item presented for scanning. In some embodiments, lighting elements of the scan field lighting modules 120 may include variable lenses to focus light at certain depths of field based on a programmatic cycle through specific depths, measured or approximated distances from a camera to an item presented for scanning within a scan field, and the like.

In some embodiments, the scanner 108 includes a distance determining module 119 and a lighting controller 121. As illustrated, the distance determining module 119 and the lighting controller 121 are illustrated as hardware devices, such as firmware, ASICs, and the like. However, in other embodiments, one or both of the distance determining module 119 and the lighting controller 121 may be present in software 130 stored in the memory and be executed by the processor 122.

The distance determining module 119 determines a distance between a scanning surface and an item presented for scanning. In some embodiments, the distance determining module includes an ultrasonic distance measuring device as are commonly available as integrated circuits. In some embodiments where the scanner 108 is a bi-optic scanner, there may be two distance determining modules 119, present on or in proximity to each of the two scanning surface. The distance determining module 119 determines the distance in such embodiments and provides the distance to the lighting controller 121.

In other embodiments, the distance determining module 119 may determine a distance between a scanning surface and an item presented for scanning based on where a surface of an item presented for scanning appears in an image received from the scanning module 118 with regard to one or more known distances within a field of view of a camera of the scanning module 118. For example, when the scanner 108 is a bi-optic scanner, the scanner 108 typically includes two scanning surfaces that are approximately perpendicular to one another—one scanning surface oriented vertically and the other horizontally. An image captured by a scanning module 118 of the horizontal scanning surface is processed in such embodiments to determine a distance of a surface of an item presented for scanning that is sufficiently parallel to the vertical scanning surface to be scanned by the scanning module 118 of the vertical scanning surface. An edge of the surface of the item presented for scanning by the vertical scanning surface may be detected by the image processing and a location of the edge is determined with regard to one or more known distance locations within the field of view of the scanning module 118 camera of the horizontal scanning surface. A similar process is also performed by the distance determining module 119 with regard to determining a distance between the item presented for scanning and a horizontal scanning surface except for the image processing is performed with regard to an image captured by a scanning module 118 camera of the vertical scanning surface.

In some embodiments, a bi-optic scanner may include two distance determining modules 119—one for each scanning surface. In other embodiments, a single distance determining module 119 may be shared between the two scanning surfaces.

Figure 2:
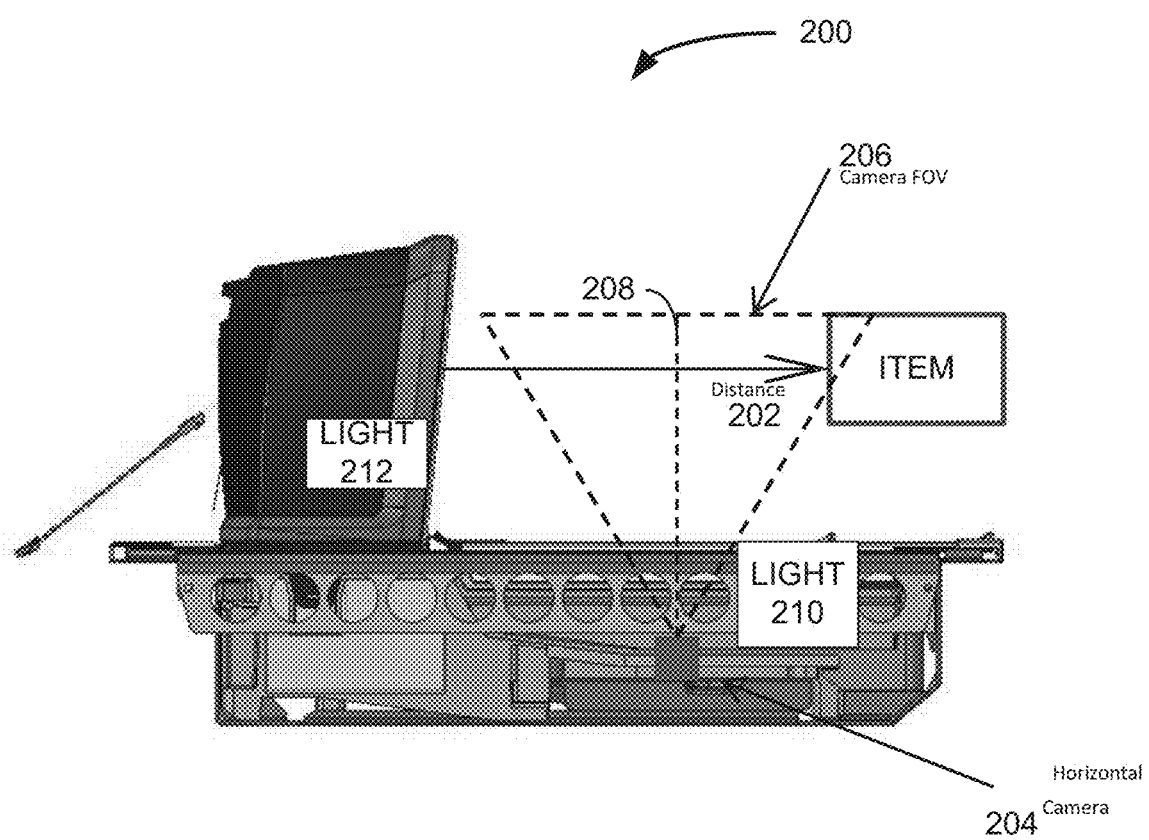
FIG. 2 is a scanner diagram, according to an example embodiment.

FIG. 2 is a scanner 200 diagram, according to an example embodiment. The illustrated scanner 200 is a an example of a bi-optic scanner on which image processing based distance determination is performed by a distance determining module, such as the distance determining module 119 discussed above with regard to FIG. 1. The scanner 200 is illustrated with regard to performing image processing based distance determination to determine a distance between a vertical scanning surface and a surface of an item presented for scanning based on an image captured by a camera 202 from the direction of the horizontal scanning surface. However, the same processing can be performed to determine a distance between the horizontal scanning surface and a surface of the item presented for scanning, although the image would be capture from a direction of the vertical scanning surface.

An image captured by the horizontal camera 204 of a field of view 206. The camera 204 field of view 206 includes a known reference point 208. The distance may be measured distance that may be used identify a lighting setting for one or more of the lights 210, 212. However, in some embodiments, the distance between the scanning surface and the item presented for scanning is determined as whether it is less or greater than the known reference point 208. As illustrated in FIG. 2, the item is greater than the known reference point 208. This information may then be used to identify a lighting setting, or be transmitted to another module to make the determination. Some embodiments may include more than one known reference point 208. In some further embodiments, a known reference point is a distance threshold range which may indicate each of two or more lights or lighting arrays are to be illuminated.

Figure 3:
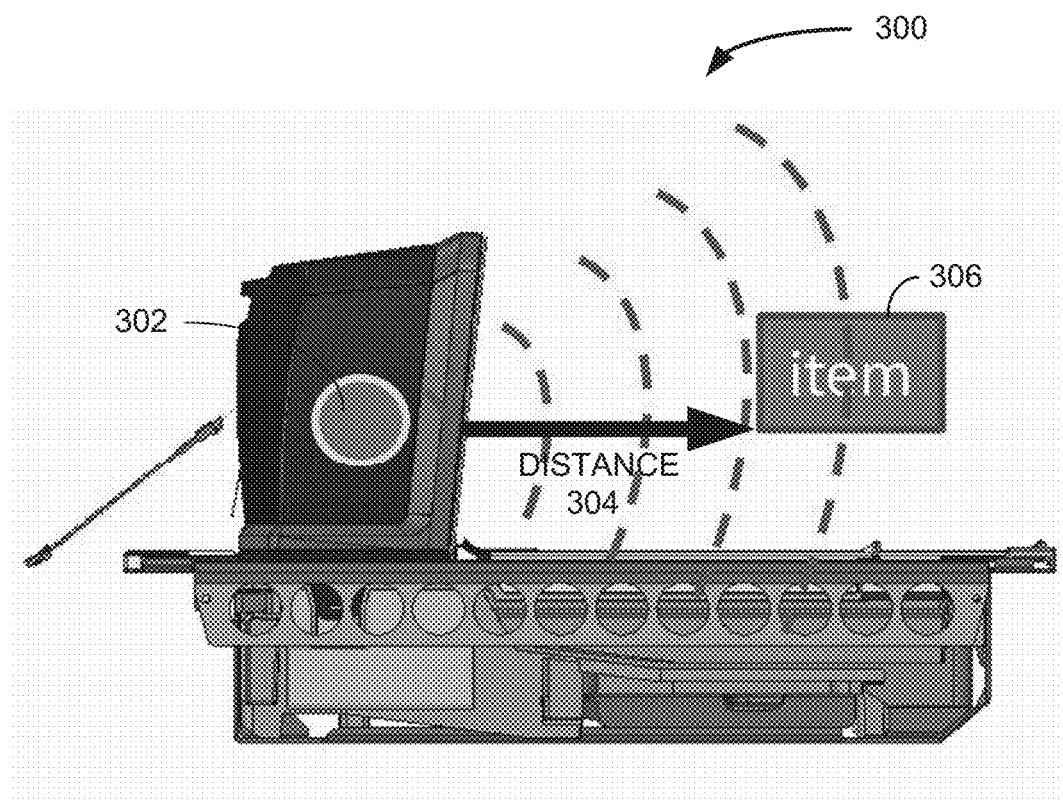
FIG. 3 is a scanner diagram, according to an example embodiment.

FIG. 3 is a scanner 300 diagram, according to an example embodiment. The scanner 300 is provided for purposes of illustrating an embodiment including an ultrasonic distance measuring device 302. Although the scanner 300 is illustrated as being a bi-optic scanner, the scanner 300 may instead have only a single scanning surface. The illustrated bi-optic scanner 300 includes only one ultrasonic distance measuring device 302. However, some embodiments may include an ultrasonic distance measuring device 302 on each of the scanning surfaces.

The ultrasonic distance measuring device 302 measures a distance between a scanning surface and the item 306 presented for scanning. The measured distance may then be provided to a lighting controller to set and adjust scan field lighting.

Figure 4:
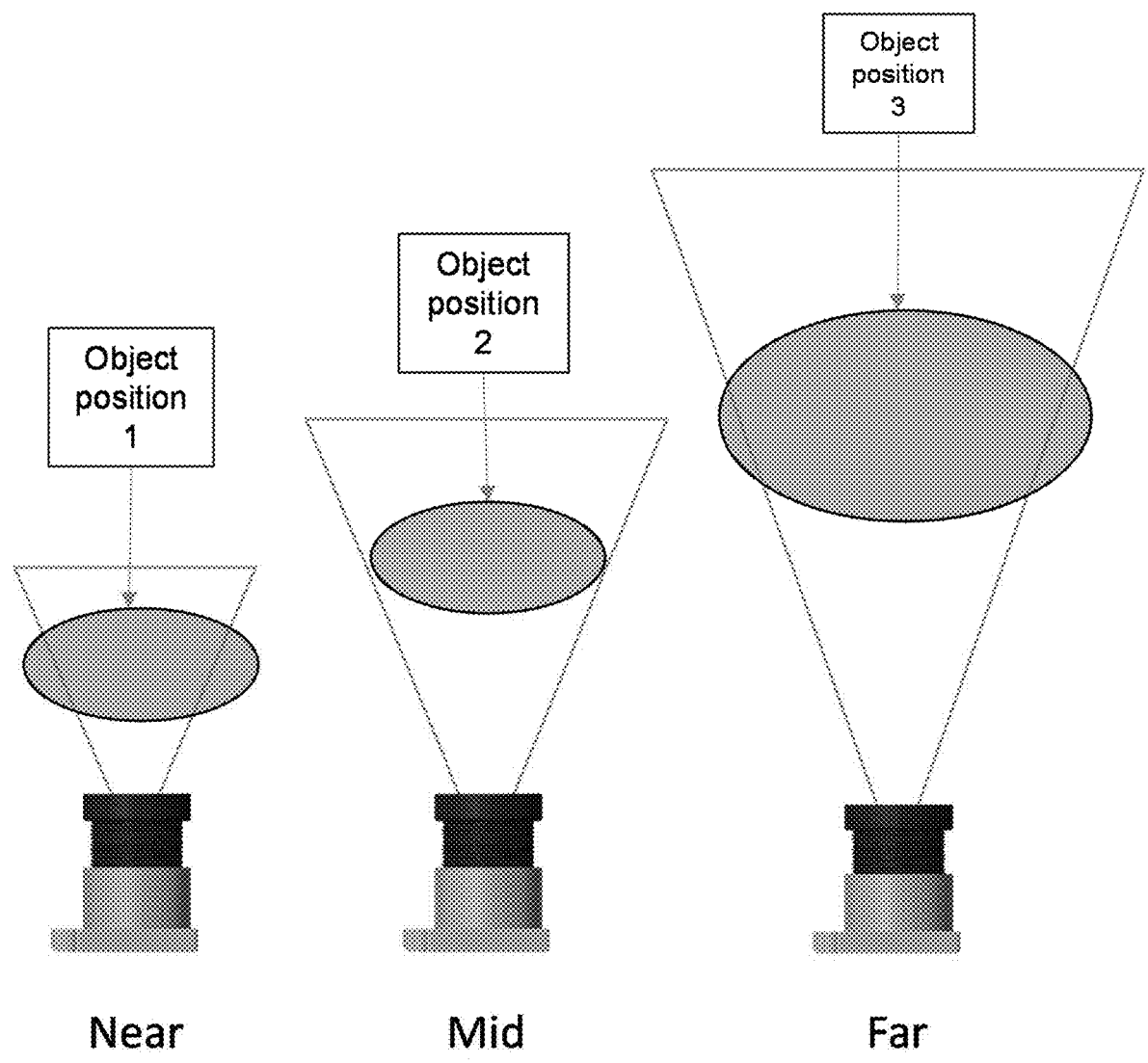
FIG. 4 illustrates three depths of field from a camera, according to an example embodiment.

FIG. 4 illustrates three depths of field from a camera, according to an example embodiment. The three illustrations include presentment of objects at positions 1, 2, and 3. Each object is illustrated at a different distance from a camera. The cone coming from each illustrated camera indicates the field of view and the dark oval represents a location distance where each respective object should be placed for scanning at a proper depth of field for a given setting or measurement.

Figure 5:
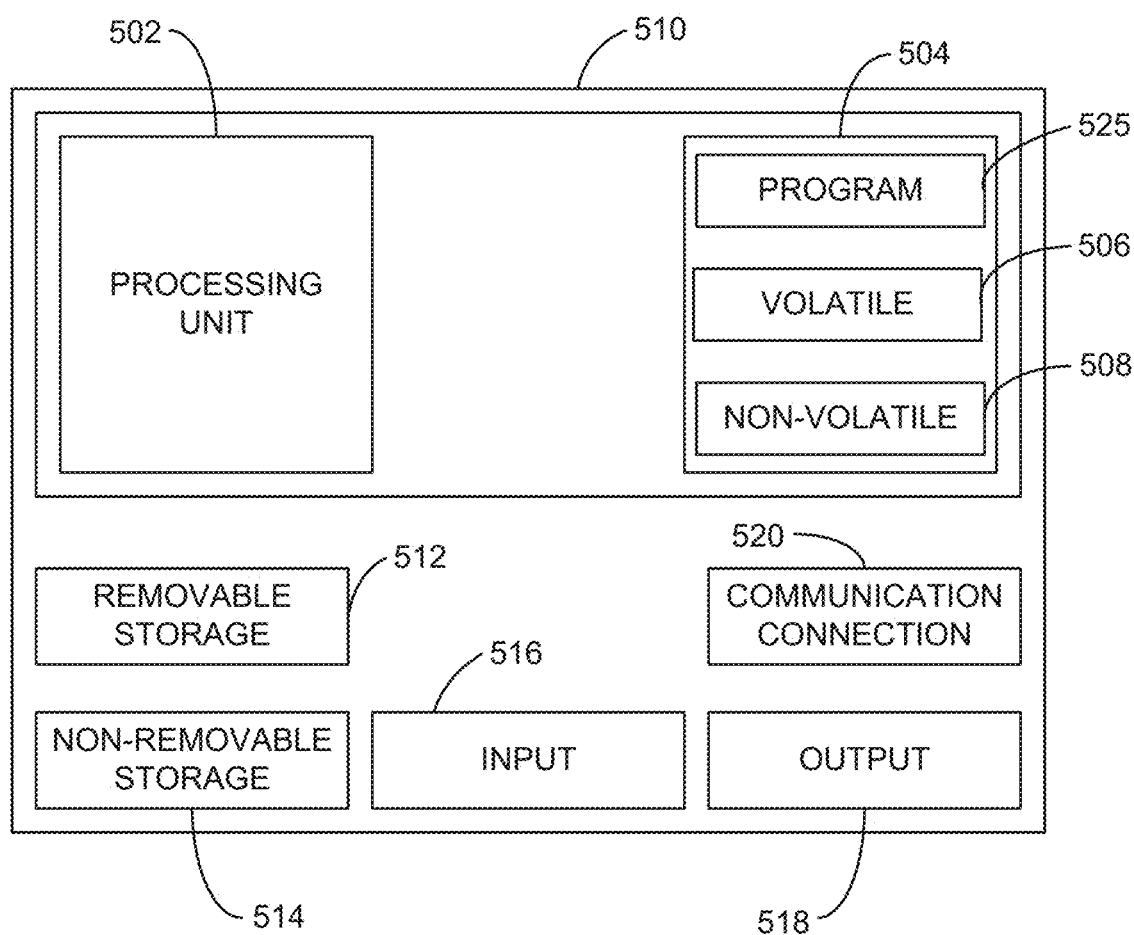
FIG. 5 is a block diagram of a computing device, according to an example embodiment.

FIG. 5 is a block diagram of a computing device, according to an example embodiment. In one embodiment, multiple such computer systems are utilized in a distributed network to implement multiple components in a transaction based environment. An object-oriented, service-oriented, or other architecture may be used to implement such functions and communicate between the multiple systems and components. One example computing device in the form of a computer 510, may include a processing unit 502, memory 504, removable storage 512, and non-removable storage 514. Memory 504 may include volatile memory 506 and non-volatile memory 508. Computer 510 may include—or have access to a computing environment that includes—a variety of computer-readable media, such as volatile memory 506 and non-volatile memory 508, removable storage 512 and non-removable storage 514. Computer storage includes random access memory (RAM), read only memory (ROM), erasable programmable read-only memory (EPROM) & electrically erasable programmable read-only memory (EEPROM), flash memory or other memory technologies, compact disc read-only memory (CD ROM), Digital Versatile Disks (DVD) or other optical disk storage, magnetic cassettes, magnetic tape, magnetic disk storage or other magnetic storage devices, or any other medium capable of storing computer-readable instructions. Computer 510 may include or have access to a computing environment that includes input 516, output 518, and a communication connection 520. The computer may operate in a networked environment using a communication connection to connect to one or more remote computers, such as database servers. The remote computer may include a personal computer (PC), server, router, network PC, a peer device or other common network node, or the like. The communication connection may include a Local Area Network (LAN), a Wide Area Network (WAN) or other networks.

Computer-readable instructions stored on a computer-readable medium are executable by the processing unit 502 of the computer 510. A hard drive, CD-ROM, and RAM are some examples of articles including a non-transitory computer-readable medium. For example, a computer program 525 capable of providing a generic technique to perform access control check for data access and/or for doing an operation on one of the servers in a component object model (COM) based system according to the teachings of the present invention may be included on a CD-ROM and loaded from the CD-ROM to a hard drive. The computer-readable instructions allow computer 510 to provide generic access controls in a COM based computer network system having multiple users and servers.

Figure 6:
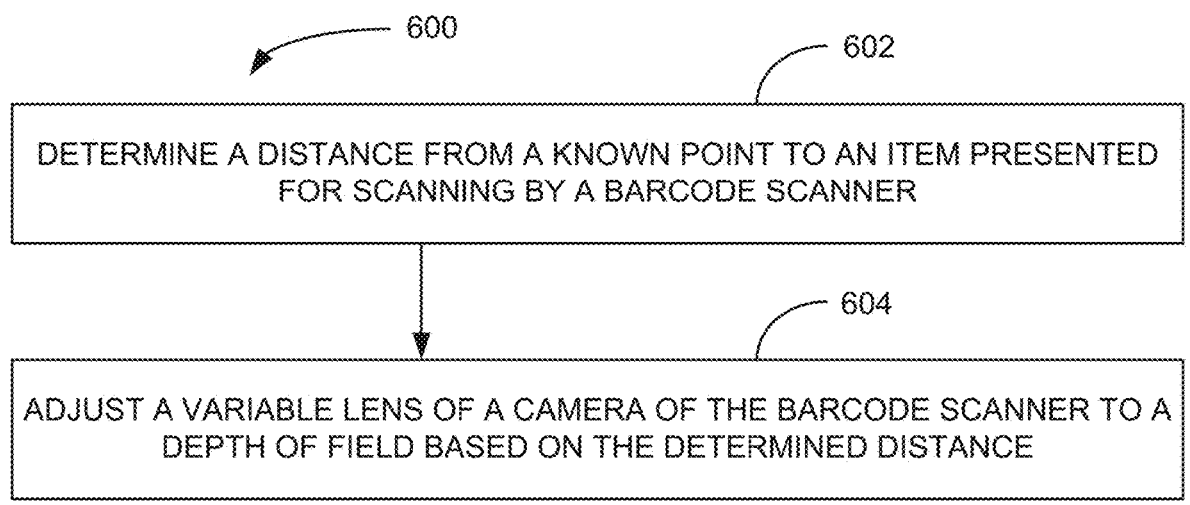
FIG. 6 is a block flow diagram of a method, according to an example embodiment.

FIG. 6 is a block flow diagram of a method 600, according to an example embodiment. The method 600 is an example of a method that may be performed on a scanner 108 of FIG. 1.

In some embodiments, the method 600 includes determining 602 a distance from a known point to an item presented for scanning by a barcode scanner. This embodiment of the method 600 further includes adjusting 604 a variable lens of a camera of the barcode scanner to a depth of field based on the determined distance. In some embodiments, determining 602 the distance from a known point to an item presented for scanning by the barcode scanner includes measuring a distance from a distance sensor to the item presented for scanning, such as with an acoustic/sonar device.

In some further embodiments, the barcode scanner is a bioptic imaging scanner including a first camera under a horizontal surface of the barcode scanner and a second camera behind a vertical surface. In some such embodiments, determining 602 the distance from a known point to an item presented for scanning by the barcode scanner includes approximating a distance from the vertical surface to the item presented for scanning by processing an image captured by the camera under the horizontal surface in view of image locations, each image location calibrated to a known distance. Further, determining 602 the distance from a known point to an item presented for scanning by the barcode scanner may further include approximating a distance from the horizontal surface to the item presented for scanning by processing an image captured by the camera behind the vertical surface in view of image locations, each image location calibrated to a known distance.

FIG. 7 is a block flow diagram of a method 700, according to an example embodiment. The method 700 is another example of a method that may be performed on a scanner 108 of FIG. 1.

A method 700 embodiment may include adjusting 702 a variable lens of a scanner camera to a first depth of field, capturing 704 a number of first images with the camera at the first depth of field, and outputting 706 at least one of the number of the first images to a barcode reading process. This is then repeated for a second depth of field in steps 708, 710, and 712 and then a third depth of field 714, 716, 218. The method 700 may then be restarted to enable the scanner to keep searching for new barcodes or to obtain a better image of a product or other item presented for scanning. The method 700 as a whole then iterates and continues to iterate in some embodiments.

In some embodiments, the depth of field of the variable lens is adjusted 702, 708, 714 by changing a voltage of an electrical current applied thereto. In some such embodiments, the voltages applied to the variable lens to adjust 702, 708, 714 the variable lens to the first, second, and third depths of field are identified based on data stored in a memory of a device performing the method 700.

In some embodiments of the method 700, the numbers of first, second, and third images are equal, but may be different, and are set as a configuration setting based on a frame rate of the camera divided by the number of depths of field at which images are captured.

It will be readily understood to those skilled in the art that various other changes in the details, material, and arrangements of the parts and method stages which have been described and illustrated in order to explain the nature of the inventive subject matter may be made without departing from the principles and scope of the inventive subject matter as expressed in the subjoined claims.

What is claimed is:

1. A method comprising:
adjusting a variable lens of a camera to a first depth of field;
capturing a number of first images with the camera at the first depth of field;
outputting at least one of the number of the first images to a barcode reading process;
adjusting the variable lens of the camera to a second depth of field;
capturing a number of second images with the camera at the second depth of field;
outputting at least one of the number of the second images to a barcode reading process;
adjusting the variable lens of the camera to a third depth of field;
capturing a number of third images with the camera at the third depth of field;
outputting at least one of the number of the third images to a barcode reading process; and
restarting the method;
wherein:
the numbers of first, second, and third images are set as a configuration setting based on a frame rate of the camera divided by the number of depths of field at which images are captured;
the first, second, and third depths of field to which the variable lens is adjusted are set according to respective stored configuration settings that are read from where they are stored; and
the camera is in a fixed location.

2. The method of claim 1, wherein the depth of field of the variable lens is adjusted by changing a voltage of an electrical current applied thereto.

3. The method of claim 2, wherein the voltages applied to the variable lens to adjust the variable lens to the first, second, and third depths of field are identified based on data stored in a memory of a device performing the method.

4. The method of claim 1, wherein the numbers of first, second, and third images are equal.

5. The method of claim 1, wherein the variable lens is a variable focus lens.

6. The method of claim 5, wherein the variable focus lens is a liquid lens.

7. The method of claim 1, wherein the method is simultaneously and independently performed with regard to at least two cameras of a barcode scanner.

8. A barcode scanner comprising:
at least one fixed-location camera, each camera having a variable lens;
a processor;
a memory device;
a barcode reading process stored in the memory that is executable by the processor;
instructions stored on the memory device that are executable by the processor to independently perform data processing activities with regard to each of the at least one cameras to adjust respective variable lenses thereof, the data processing activities comprising:

adjusting a variable lens of a camera to a first depth of field;
capturing a number of first images with the camera at the first depth of field;
outputting at least one of the number of the first images to the barcode reading process;
adjusting the variable lens of the camera to a second depth of field;
capturing a number of second images with the camera at the second depth of field;
outputting at least one of the number of the second images to the barcode reading process;
adjusting the variable lens of the camera to a third depth of field;
capturing a number of third images with the camera at the third depth of field;
outputting at least one of the number of the third images to the barcode reading process; and
restarting the data processing activities with regard to the respective camera;

wherein:
the numbers of first, second, and third images are set as a configuration setting based on a frame rate of the camera divided by the number of depths of field at which images are captured;
the first, second, and third depths of field to which the variable lens is adjusted are set according to respective stored configuration settings that are read from where they are stored.

9. The barcode scanner of claim 8, wherein the variable lens is a variable focus lens.

10. The barcode scanner of claim 9, wherein the variable focus lens is a liquid lens.

11. The barcode scanner of claim 8, wherein the numbers of first, second, and third images are set as a configuration setting stored in the memory based on a frame rate of the camera divided by the number of depths of field at which images are captured.

* * * * *